US006674270B2

(12) United States Patent
Sakamoto

(10) Patent No.: US 6,674,270 B2

(45) Date of Patent: Jan. 6, 2004

(54) POWER CUTOFF DEVICE

(75) Inventor: Masato Sakamoto, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/095,077

(22) Filed: Mar. 12, 2002

(65) Prior Publication Data

US 2002/0130647 A1 Sep. 19, 2002

(30) Foreign Application Priority Data

Mar. 14, 2001 (JP) ....................................... 2001-072152

(51) Int. Cl.[7] ............................... G05F 1/40; H02J 1/10

(52) U.S. Cl. .......................... 323/272; 323/282; 307/44

(58) Field of Search ................................ 323/282, 283, 323/284, 285, 266, 272, 277, 267, 276; 361/18, 86, 87, 88, 89, 94, 111; 307/44, 64, 19, 66, 65, 43

(56) References Cited

U.S. PATENT DOCUMENTS 4,008,418 A * 2/1977 Murphy ........................ 361/18
4,020,395 A * 4/1977 Erickson et al. .............. 361/59
4,716,354 A * 12/1987 Hacker ........................ 320/39
5,083,078 A * 1/1992 Kiibler et al. .............. 323/268
5,184,036 A * 2/1993 Kesler et al. ............... 307/540
5,412,308 A * 5/1995 Brown ....................... 323/267
6,058,030 A * 5/2000 Hawkes et al. ............... 363/65

* cited by examiner

*Primary Examiner*—Rajnikant B. Patel
(74) *Attorney, Agent, or Firm*—Arent Fox Kintner Plotkin & Kahn, PLLC

(57) ABSTRACT

A power cutoff device is provided to adjust the transient characteristics of a power voltage caused at a cutoff of the power voltage. The power cutoff device is provided between power lines, which supply constant voltages generated at a multi-power circuit to a plurality of load circuits respectively as power voltages, and ground lines. The power cutoff device detects, by means of an error detection unit, a change in the power voltage in the transient state caused at a cutoff of the power voltages, and outputs an error detection signal. Further, variable current sink units respectively connected to the power lines set their respective sink currents equivalent to values of the level of the error detection signal amplified by their respective coefficients. Then, by independently sinking currents from the power lines to the ground lines according to the sink currents, respectively, it is possible to adjust attenuation factors of the power voltages in the transient state, a time necessary to reach the level of the ground line for each, etc.

5 Claims, 7 Drawing Sheets

POWER CUTOFF DEVICE

BACKGROUND OF THE INVENTION

The present invention relates to a power cutoff device, and more particularly to a power cutoff device capable of suitably adjusting transient characteristics of a power voltage caused at a cutoff of the power voltage being supplied to a load circuit.

The present application claims priority from Japanese Application No. 2001-072152, the disclosure of which is incorporated herein for all purpose.

It has been known that some types of integrated circuit devices, such as an LSI and a VLSI, hybrid circuit devices of an analog circuit and a digital circuit, multi-functional, high-performance electric circuit boards having thereon mounted many electronic circuits demand more than one power voltage in order to operate in a satisfactory manner.

Such integrated circuit devices, hybrid circuit devices, and electric circuit boards (hereinafter, referred to collectively as the electronic circuit device) are generally arranged in such a manner that, as shown in FIG. 6, power input terminals P1, P2, and P3, and a ground terminal PGND provided to an electronic circuit device DVC are connected to a multi-power circuit VREG with a common ground GND, whereby a plurality of constant voltages V1, V2, and V3 generated at the multi-power circuit VREG are applied as power voltages Vcc1, Vcc2, and Vcc3, respectively.

FIG. 6 is a view showing a case where the electronic circuit device DVC is provided with three electronic circuits (hereinafter, referred to as the load circuits) LOAD1, LOAD2, and LOAD3 respectively operating on three power voltages each having a different value, and constant voltages V1, V2, and V3 generated at the multi-power circuit VREG are applied to the load circuits LOAD1, LOAD2, and LOAD3 through open/close switches SW1, SW2, and SW3, respectively.

Herein, by setting a control signal Son/off, which is outputted from an ON/OFF control circuit CNT for controlling power-up and power cutoff, to the logical level "H", the open/close switches SW1, SW2, and SW3 are simultaneously closed (switched ON), whereupon the constant voltages V1, V2, and V3 are applied to the load circuits LOAD1, LOAD2, and LOAD3, respectively. On the other hand, by shifting the control signal Son/off to the logical level "L" from "H", the closed open/close switches SW1, SW2, and SW3 are simultaneously opened (switched OFF), whereupon the constant voltages V1, V2, and V3 respectively being applied to the LOAD1, LOAD2, and LOAD3 are cut off.

According to the typical arrangement of connecting the multi-power circuit VREG to the electronic circuit device DVC as shown in FIG. 6, however, in a case where the control signal Son/off is shifted to the logical level "L" from "H", and the constant voltages V1, V2, and V3 respectively being applied to the load circuits LOAD1, LOAD2, and LOAD3 are cut off by opening the open/close switches SW1, SW2, and SW3 at this point of change (hereinafter, referred to as the cutoff point) toff, as shown in FIG. 7 by way of example, the power voltages Vcc1, Vcc2, and Vcc3 start to attenuate to the ground level as residual voltages in their respective load circuits LOAD1, LOAD2, and LOAD3 while exhibiting different transient characteristics.

In other words, time constants related to the power voltages Vcc1, Vcc2, and Vcc3 may vary from each other depending on a difference in the standards among the load circuits LOAD1, LOAD2, and LOAD3, a difference in wiring capacitances and resistance values between the multi-power circuit VREG and each of the load circuits LOAD1, LOAD2, and LOAD3. Thus, even when the power is cut off simultaneously at the cutoff point toff, the power voltages Vcc1, Vcc2, and Vcc3 actually have different transient characteristics in the transient period after the cutoff point toff, and therefore, a time necessary to reach the ground level, an attenuation factor, etc. may vary for each.

Accordingly, voltages determined in advance by the ratings or the like which are not supposed to be applied, are applied to the load circuits LOAD1, LOAD2, and LOAD3 during the transient period since the cutoff point toff until the power voltages Vcc1, Vcc2, and Vcc3 attenuate to the ground level, which poses a problem that the load circuits LOAD1, LOAD2, and LOAD3 cause a malfunction, break, or shorten their service lives.

For example, suppose that the electronic circuit DVC may possibly cause a malfunction at the load circuits LOAD1, LOAD2, and LOAD3 unless the power voltages Vcc1, Vcc2, and Vcc3 respectively applied to the load circuits LOAD1, LOAD2, and LOAD3 are set to satisfy an inequality, Vcc1>Vcc2>Vcc3 during a normal operation, and during the transient period after the cutoff point toff, the power voltage Vcc3 attenuates to the ground level first followed by the power voltage Vcc1, and the power voltage Vcc2 attenuates gradually in comparison with the power voltage Vcc1. Then, as shown in FIG. 7, there is a problem that the power voltages Vcc1, Vcc2, and Vcc3 do not attenuate in accordance with the predetermined order and with predetermined voltage values because of influences of the time constants or the like.

SUMMARY OF THE INVENTION

The present invention has been devised to solve the conventional problems, and therefore, has an object to provide a power cutoff device capable of suitably adjusting the transient characteristics of a power voltage caused at a cutoff of the power voltage being supplied to a load circuit or the like, for example, a power cutoff device for allowing suitable use of various kinds of electronic circuit devices operating on more than one power voltage.

In order to achieve the above and other objects, a power cutoff device of the present invention is a power cutoff device for cutting off a power voltage being supplied to a load circuit, including: power voltage detecting means and current sink means provided between a power line and a ground line, the power line supplying a voltage generated by power means to the load circuit as the power voltage, wherein the power voltage detecting means detects a change in the power voltage generated on the power line and outputs a detection signal; and the current sink means sets a sink current corresponding to a level of the detection signal and sinks a current from the power line toward the ground line.

According to the power cutoff device arranged as above, a supply of the power voltage from the power means to the load circuit is cut off, whereupon the power voltage enters the transient state. Then, the power voltage detecting means detects a power voltage in the transient state and outputs a detection signal. The current sink means sets a sink current corresponding to the level of the detection signal, and sinks a current from the power line toward the ground line according to the sink current.

By sinking the current according to the sink current, it is possible to suitably adjust the attenuation factor of the power voltage in the transient state, a time necessary to reach the level of the ground line, etc.

Also, a power cutoff device of the present invention is a power cutoff device for cutting off a plurality of power voltages being supplied to a plurality of load circuits, including: power voltage detecting means and current sink means provided between a plurality of power lines and a ground line, the plurality of power lines supplying a plurality of voltages generated by power means to the plurality of load circuits as the plurality of power voltages, wherein the power voltage detecting means detects a change in a power voltage generated on any of the plurality of power lines and outputs a detection signal, and the current sink means sets a sink current corresponding to a level of the detection signal and sinks a current from each of the plurality of power lines toward the ground line independently.

Further, a power cutoff device of the present invention is a power cutoff device for cutting off a plurality of power voltages being supplied to a plurality of load circuits, including: power voltage detecting means and current sink means provided between a plurality of power lines and a ground line, the plurality of power lines supplying a plurality of voltages generated by power means to the plurality of load circuits as the plurality of power voltages, wherein the power voltage detecting means detects a change in a power voltage generated on each of the plurality of power lines and outputs a detection signal corresponding to each power voltage, and the current sink means sets a sink current corresponding to a level of the detection signal corresponding to each power voltage and sinks a current from each of the plurality of power lines toward the ground line independently.

According to the power cutoff devices arranged as above, when a supply of each power voltage to an electronic circuit device provided with a plurality of load circuits each operating independently on their respective power voltages is cut off, the power voltage detecting means detects at least one of power voltages in the transient state and outputs a detection signal. The current sink means sets a sink current corresponding to the level of the detection signal, and sinks a current from each power line toward the ground line independently. Hence, it is possible to suitably adjust the attenuation factor of each power voltage being applied to their respective load circuits, a time necessary to reach the level of the ground line for each, etc. Consequently, in case that the transient characteristics of the power voltages with respect to each other are determined in advance by the ratings or the like to prevent the occurrence of a malfunction of the load circuits or the like, it is possible to adequately set transient characteristics by sinking a current from each power line to the ground line independently.

In addition, the power voltage detecting means and the current sink means operate upon supply of electricity from the power voltage generated on the power line.

According to the above arrangement, a special power or the like for operating the power cutoff device can be omitted, thereby making it possible to reduce the power consumption, and downsize and simplify the circuit.

Furthermore, the current sink means sets a sink current equivalent to a value of the detection signal outputted from the power voltage detecting means and amplified by an adjustable amplification factor.

According to the above arrangement, by adjusting the amplification factor, it is possible to adequately adjust a value of a sink current. Consequently, it is possible to accurately adjust a change in the power voltage in the transient state.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
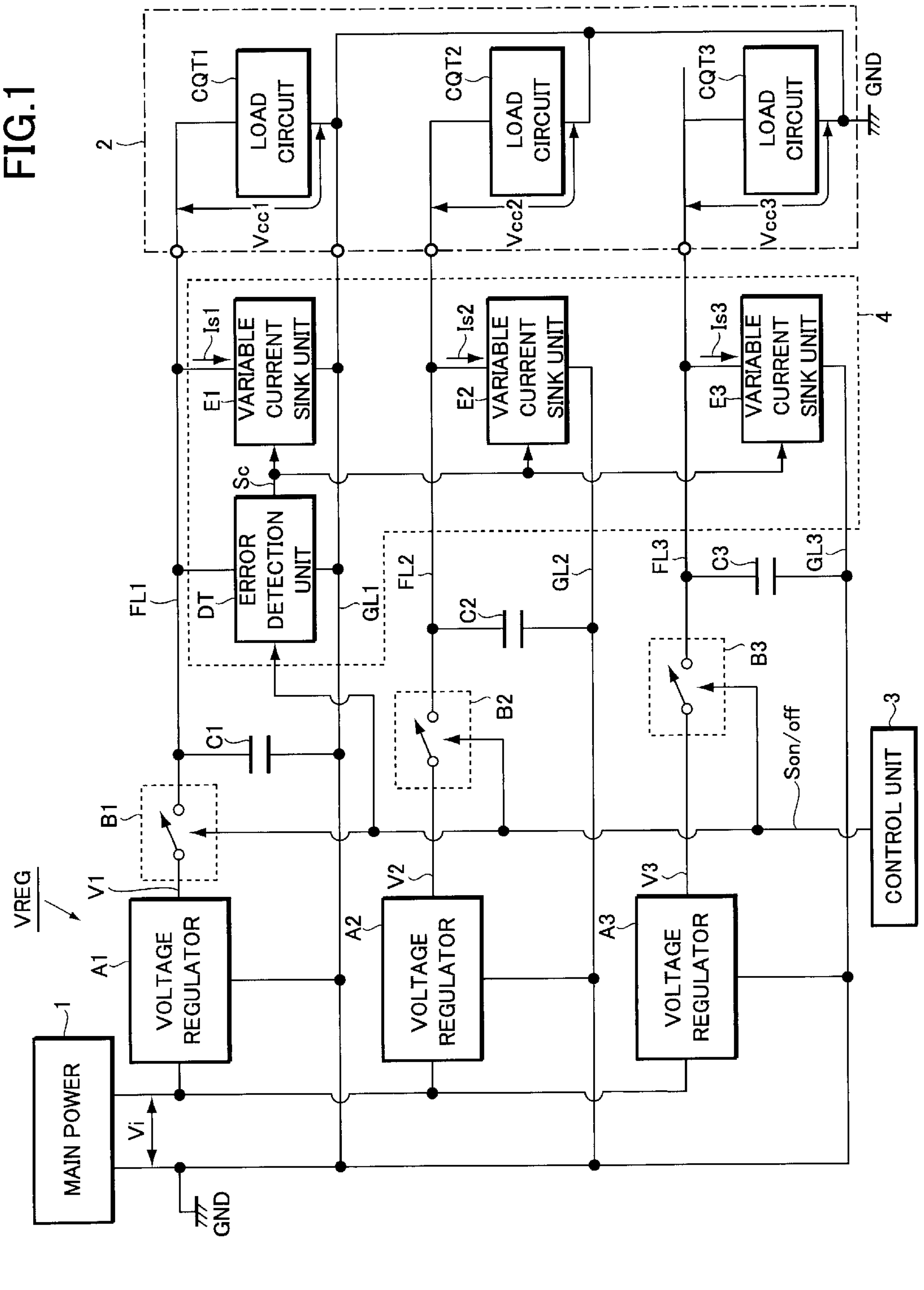
FIG. 1 is a block diagram depicting an arrangement of a power cutoff device according to one embodiment of the present invention.
Figure 2:
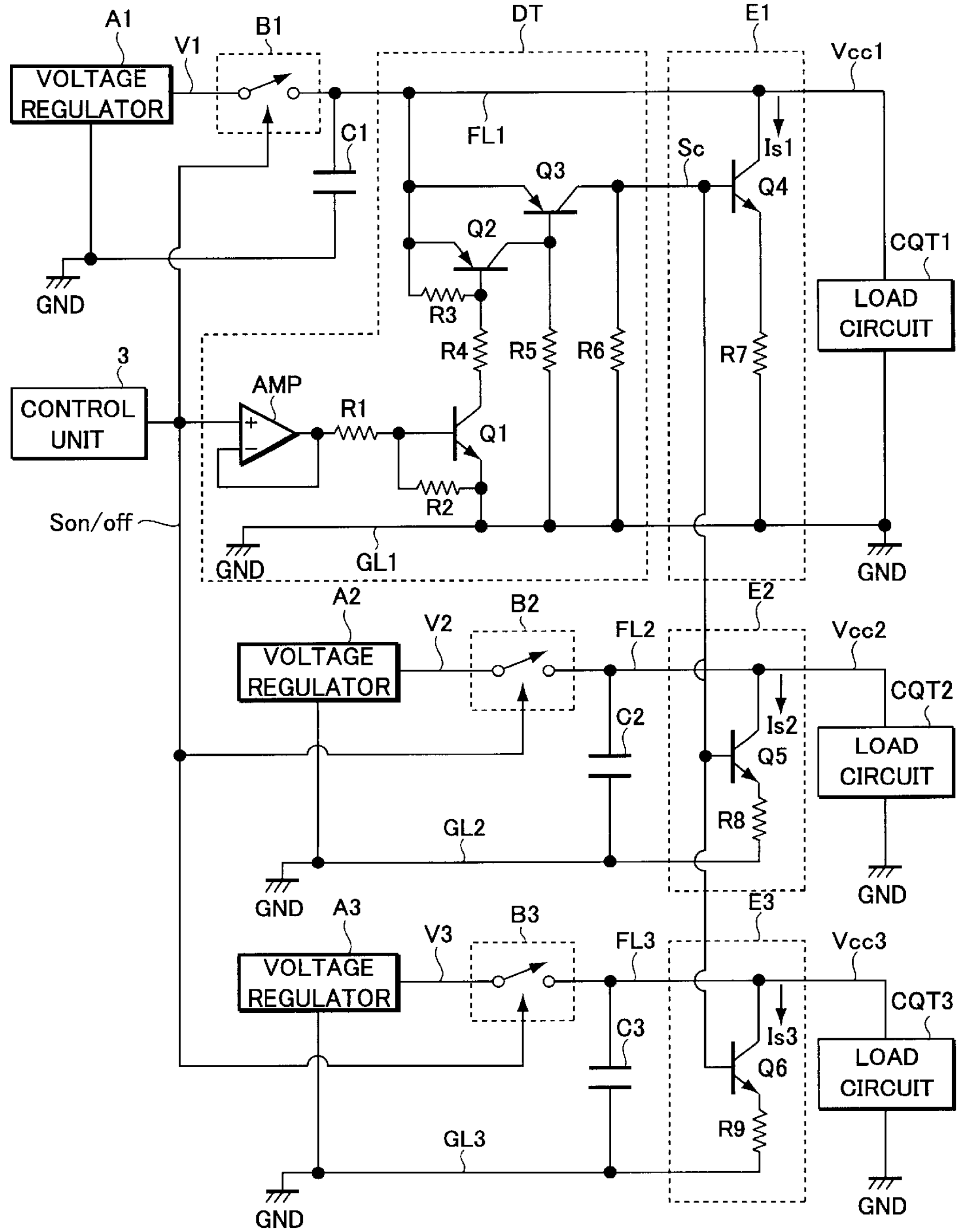
FIG. 2 is a circuit diagram showing more concretely the arrangement of the power cutoff device according to one embodiment of the present invention.

The following description will describe one embodiment of the present invention with reference to the accompanying drawings. FIG. 1 is a block diagram depicting an arrangement of a power cutoff device of the present embodiment, and FIG. 2 is a circuit diagram showing more concretely the arrangement of the power cutoff device of the present embodiment.

For ease of explanation, the following description will describe a case where a power cutoff device 4 of the present embodiment is applied to an electronic circuit device 2 which needs three power voltages, 5 volts, 3.3 volts, and 2.7 volts, as an example of the electronic circuit device which needs more than one power voltage, such as an integrated circuit device, a hybrid circuit device, and an electric circuit board.

Referring to FIG. 1, three voltage regulators A1, A2, and A3 are connected to a large-capacity main power I for generating and outputting a predetermined voltage Vi from electricity obtained from an alternating commercial power or a car battery, and the voltage regulators A1, A2, and A3 are designed so that they output constant voltages V1 (=5 volts), V2 (=3.3 volts), and V3 (=2.7 volts), respectively.

A multi-power circuit VREG as power means is composed of the three voltage regulators A1, A2, and A3 or the three voltage regulators Al, A2, and A3 plus the main power 1.

Herein, the grounds of the voltage regulators A1, A2, and A3 are connected respectively to ground lines GL1, GL2, and GL3, which are commonly connected to a ground GND of the main power 1.

Voltage output terminals (no numerical references are given) of the voltage regulators A1, A2, and A3 are connected to open/close switch elements B1, B2, and B3, respectively, each of which is composed of a switching power transistor or the like having a high withstand voltage and a bulk power, and the opening and closing operations of the open/close switch elements B1, B2, and B3 are controlled simultaneously by a control signal Son/off outputted from a control circuit 3.

When the control signal Son/off is set to the logical level "H", the open/close switch elements B1, B2, and B3 are closed (switched ON) simultaneously, and when the control signal Son/off is shifted to the logical level "L" from "H", the switching-ON open/close switch elements B1, B2, and B3 are opened (switched OFF) simultaneously in synchronization with the point (cutoff point) toff at which the logical level has changed.

Power lines FL1, FL2, and FL3, which supply the electronic circuit device 2 with constant voltages V1, V2, and V3 respectively as power voltages Vcc1, and Vcc2, and Vcc3, are connected to the output ends of the open/close elements B1, B2, and B3, respectively. As shown in the drawing, large-capacity capacitors (hereinafter, referred to as capacitance elements) C1, C2, and C3 are connected across the power lines FL1, FL2, and FL3 and the ground lines GL1, GL2, and GL3, respectively, so that the capacitance elements C1, C2, and C3 stabilize the power voltages Vcc1, Vcc2, and Vcc3, respectively.

Then, as shown in the drawing, the electronic circuit device 2 provided with a load circuit CQT1 operating on the power voltage Vcc1 (=5.0 volts), a load circuit CQT2 operating on the power voltage Vcc2 (=3.3 volts), and a load circuit CQT3 operating on the power voltage Vcc3 (=2.7 volts) is connected to the power lines FL1, FL2, and FL3 and to the ground lines GL1, GL2, and GL3 as needed.

The power cutoff device 4 is connected across the power lines FL1, FL2, and FL3 and the ground lines GL1, and GL2, and GL3.

To be more specific, the power cutoff device 4 is provided with an error detection unit DT and three variable current sink units E1, E2, and E3, and the error detection unit DT is connected across the power line FL1 and the ground line GL1, the variable current sink units E1, E2, and E3 are connected across the power line FL1 and the ground line GL1, across the power line FL2 and the ground line GL2, and across the power line FL3 and the ground line GL3, respectively.

Further, when the control signal Son/off supplied from the control unit 3 shifts to the logical level "L" from "H", the error detection unit DT detects a change in the power voltage Vcc1 between the power line FL1 and the ground line GL1 from the point (cutoff point) toff at which the logical level has changed. To be more specific, when the control signal Son/off shifts to the logical level "L" from "H", the open/close switch elements B1, B2, and B3 are opened simultaneously as discussed above, whereby the supply of the power voltages to the electronic circuit device 2 is cut off. As a result, the power voltages Vcc1, Vcc2, and Vcc3 between the power lines FL1, FL2, and FL3 and the ground lines GL1, GL2, and GL3, respectively, start to attenuate gradually to the ground level during the transient period after the cutoff point toff. The error detection unit DT detects a change in the power voltage Vcc1 during the transient period, and outputs an error detection signal Sc which represents the detection result.

The variable current sink units E1, E2, and E3 are provided with active elements, such as transistors, for respectively setting sink currents Is1, Is2, and Is3, which are proportional to the level of the error detection signal Sc.

To be more specific, the variable current sink unit E1 sets the sink current Is1 equivalent to a value of the level of the error detection signal Sc amplified by a predetermined proportion coefficient k1, the variable current sink unit E2 sets the sink current Is2 equivalent to a value of the level of the error detection signal Sc amplified by a predetermined proportion coefficient k2, and the variable current sink unit E3 sets the sink current Is3 equivalent to a value of the level of the error detection signal Sc amplified by a predetermined proportion coefficient k3. Herein, the proportion coefficients k1, k2 and k3 can be adjusted to arbitrary values, which in turn makes it possible to set the sink currents Is1, Is2, and Is3 independently.

Then, the variable current sink unit E1 sinks the sink current Is1 from the power line FL1 toward the ground line GL1, the variable current sink unit E2 sinks the sink current Is2 from the power line FL2 toward the ground line GL2, and the variable current sink unit E3 sinks the sink current Is3 from the power line FL3 toward the ground line GL3.

Next, the following description will describe more concretely the arrangement of the power cutoff device 4 with reference to FIG. 2. In FIG. 2, like components are labeled with like reference numerals with respect to FIG. 1 for ease of explanation.

The error detection unit DT is provided with an NPN transistor Q1 and PNP transistors Q2 and Q3. The base of the NPN transistor Q1 is supplied with the control signal Son/off outputted from the control unit 3 through a buffer amplifier AMP and a resistor R1. Also, a bias resistor R2 is connected across the base of the NPN transistor Q1 and the emitter thereof connected to the ground line GL1, and the collector of the NPN transistor Q1 is connected to the power line FL1 through resistors R4 and R3.

In regard to the PNP transistor Q2, the base is connected to a contact between the resistors R3 and R4, and the emitter is connected to the power line FL1, while the collector is connected to the base of the PNP transistor Q3 and to the ground line GLI through a resistor R5.

In regard to the PNP transistor Q3, as has been discussed above, the base is connected to the collector of the PNP transistor Q2 and to the resistor R5, and the emitter is connected to the power line FL1, while the collector is connected to the ground line GL1 through a resistor R6 and to each of the bases of NPN transistors Q4, Q5, and Q6 respectively included in the variable current sink units E1, E2, and E3.

According to the error detection unit DT arranged as above, when the control signal Son/off from the control circuit 3 shifts to the logical level "H", the open/close switch elements B1, B2, and B3 are closed (switched ON), whereupon the power line FL1 is supplied with the constant voltage V1 from the voltage regulator A1 as the power voltage Vcc1, and further, the NPN transistor Q1 is turned ON.

Then, a predetermined current from the power line FL1 flows into the turning-ON NPN transistor Q1 through the resistors R3 and R4, and a predetermined voltage drop occurs at the resistor R3, which turns ON the PNP transistor Q2 also as it is forward-biased.

Further, a predetermined current flows in the resistor R5 from the power line FL1 through the PNP transistor Q2, and a predetermined voltage drop occurs at the resistor R5, which turns OFF the PNP transistor Q3, whereby the error detection signal Sc generated across the resistor R6 and the ground line GL1 are at substantially the same potential. Hereinafter, the potential at which the error detection signal Sc and the ground line GL1 will be at substantially the same potential is referred to as the OFF potential.

On the other hand, when the control signal Son/off from the control unit 3 shifts to the logical level "L" from "H", the open/close switch elements B1, B2, and B3 are opened (switched OFF) by the shifting to the logical level "L", whereby the supply of the constant voltage V1 from the voltage regulator A1 to the power line FL1 is cut off, and further, the NPN transistor Q1 is turned OFF.

It should be appreciated, however, that because of the capacitance and resistance of the load circuit CQTI and the power line FL1 and the influence of the capacitance element C1, the power voltage Vcc1 of the power line FL1 does not drop to exactly the same level as the ground line GL1 at the point (cutoff point) toff at which the control signal Son/off has shifted to the logical level "L" to "H", and instead, it enters the transient state.

Hence, while the power voltage Vcc1 is in the transient state (that is, during the transient period), the NPN transistor Q1 stays OFF and so does the PNP transistor Q2 as a consequence, and further, the PNP transistor Q3 is set under a forward-biased condition by the resistor R5 connected to the ground line GL1.

Hence, a current, which corresponds to a residual voltage when the power voltage Vcc1 is in the transient state, flows toward the resistor R6 from the voltage line FL1 through the PNP transistor Q3, whereby the error detection signal Sc proportional to the residual voltage is generated across the resistor R6.

As has been discussed, the error detection unit DT outputs the error detection signal Sc which will be at the OFF potential when the control signal Son/off is set to the logical level "H", and when the control signal Son/off is set to the logical level "L", it detects the power voltage Vcc1 in the transient state and outputs the error detection signal Sc proportional to the power voltage Vcc1 (residual voltage).

The variable current sink unit E1 is composed of the NPN transistor Q4 and a resistor R7, and in regard to the NPN transistor Q4, its collector is connected to the power line FL1, and as has been discussed above, its base is connected to the collector of the PNP transistor Q3, while its emitter is connected to the ground line GL1 through the resistor R7. In other words, the NPN transistor Q4 establishes a common-emitter connection somewhere between the power line FL1 and the ground line GL1 together with the resistor (so-called emitter resistor) R7 connected to the emitter.

Hence, the NPN transistor Q4 stays OFF when it is supplied with the error detection signal Sc which will be at the OFF potential from the error detection unit DT, in other words, when the load circuit CQT1 operates normally by virtue of the power voltage Vcc1 (=5.0 volts).

Consequently, the sink current Is1 becomes nearly 0, and the variable current sink unit E1 has substantially no effect on the power line FL1 and the ground line GL1. Also, power consumption of the variable current sink unit E1 is reduced to an extremely low, negligible level.

In contrast, during the transient period as discussed above, upon supplying the error detection signal Sc proportional to the power voltage Vcc1 from the error detection unit DT to the NPN transistor Q4, the NPN transistor Q4 sets the sink current Is1 equivalent to a value of the error detection signal Sc amplified by the amplification factor (proportion coefficient) k1 which is determined by the base resistance ($R_B$), the current amplification factor ($h_{FE}$), and the base-emitter voltage ($V_{BE}$) of the NPN transistor Q4 and the resistor R7.

Further, because of the common-emitter connection, the NPN transistor Q4 has high output impedance at the power line FL1 side (the impedance is high when the collector of the NPN transistor Q4 is viewed from the power line FL1 side), and for this reason, the sink current Is1 proportional to the level of the error detection signal Sc is sunk from the power line FL1 toward the ground line GL1 without any influence of the impedance at the power line FL1 side including the load circuit CQT1.

The variable current sink unit E2 is composed of the NPN transistor Q5 and a resistor R8, and in regard to the NPN transistor Q5, its collector is connected to the power line FL2, and as has been discussed above, its base is connected to the collector of the PNP transistor Q3, while its emitter is connected to the ground line GL2 through the resistor R8, thereby establishing a common-emitter connection.

Hence, the NPN transistor Q5 stays OFF when it is supplied with the error detection signal Sc which will be at the OFF potential from the error detection unit DT, in other words, when the load circuit CQT2 operates normally by virtue of the power voltage Vcc2 (=3.3 volts). Consequently, the sink current Is2 becomes nearly 0, and the variable current sink unit E2 has substantially no effect on the power line FL2 and the ground line GL2.

In contrast, during the transient period as discussed above, upon supply of the error detection signal Sc proportional to the power voltage Vcc1 (residual voltage) from the error detection unit DT, the NPN transistor Q5 sets the sink current Is2 equivalent to a value of the error detection signal Sc amplified by the amplification factor (proportion coefficient) k2 which is determined by the base resistance (RB), the current amplification factor (hFE), and the base-emitter voltage (VBE) of the NPN transistor Q5 and the resistor R8.

Further, because of the common-emitter connection, the NPN transistor Q5 has high output impedance at the power line FL2 side (the impedance is high when the collector of the NPN transistor Q5 is viewed from the power line FL2 side). For this reason, the sink current Is2 proportional to the level of the error detection signal Sc is sunk from the power line FL2 toward the ground line GL2 without any influence of the impedance at the power line FL2 side including the load circuit CQT2.

The variable current sink unit E3 is composed of the NPN transistor Q6 and a resistor R9, and in regard to the NPN transistor Q6, its collector is connected to the power line FL3, and as has been discussed above, its base is connected to the collector of the PNP transistor Q3, while its emitter is connected to the ground line GL3 through the resistor R9.

In other words, the NPN transistor Q6 also establishes a common-emitter connection somewhere between the power line FL3 and the ground line GL3 together with the resistor R9 in the same manner as the NPN transistors Q4 and Q5.

Hence, the NPN transistor Q6 stays OFF when it is supplied with the error detection signal Sc which will be at the OFF potential from the error detection unit DT, in other words, when the load circuit CQT3 operates normally by virtue of the power voltage Vcc3 (=2.7 volts). Consequently, the sink current Is3 becomes nearly 0, and the variable current sink unit E3 has substantially no effect on the power line FL3 and the ground line GL3.

In contrast, during the transient period as discussed above, upon supply of the error detection signal Sc proportional to the power voltage Vcc1 from the error detection unit DT, the NPN transistor Q6 sets the sink current Is3 equivalent to a value of the error detection signal Sc amplified by the amplification factor (proportion coefficient) k3 which is determined by the base resistance ($R_B$), the current amplification factor ($h_{FE}$), and the base-emitter voltage ($V_{BE}$) of the NPN transistor Q6 and the resistor R9.

Further, because of the common-emitter connection, the NPN transistor Q6 has high output impedance at the power line FL3 side (the impedance is high when the collector of the NPN transistor Q6 is viewed from the power line FL3 side). For this reason, the sink current Is3 proportional to the level of the error detection signal Sc is sunk from the power line FL3 toward the ground line GL3 without any influence of the impedance at the power line FL3 side including the load circuit CQT3.

By setting the values of the resistors R7, R8 and R9 respectively provided to the variable current sink units E1, E2, and E3 as needed, it is possible to adjust the amplification factors (proportion coefficients) k1, k2, and k3 independently during the transient period, which in turn makes it possible to adjust the sink currents Is1, Is2, and Is3 independently.

Figure 3:
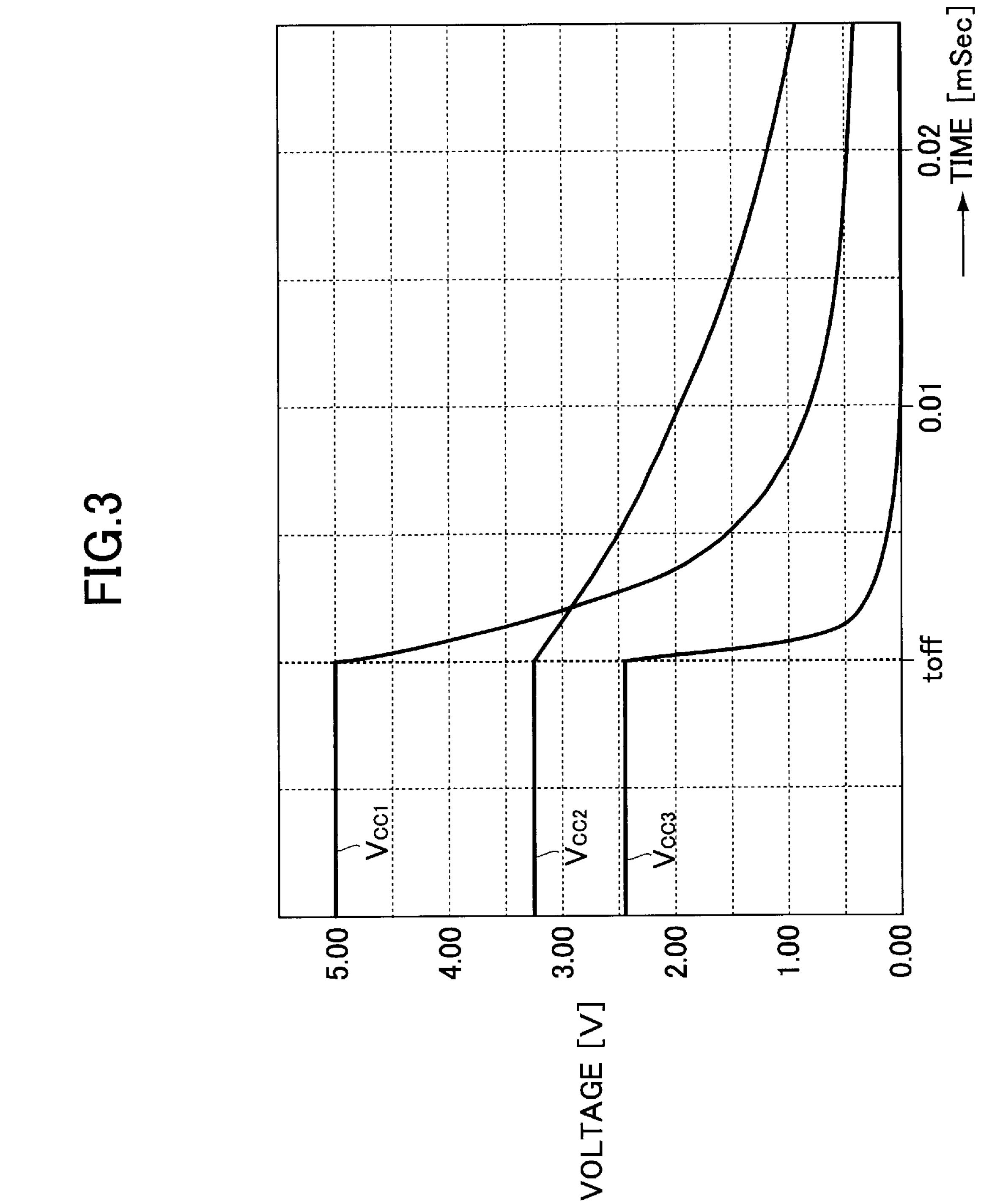
FIG. 3 is a characteristic graph explaining an operation of the power cutoff device according to one embodiment of the present invention.
Figure 4:
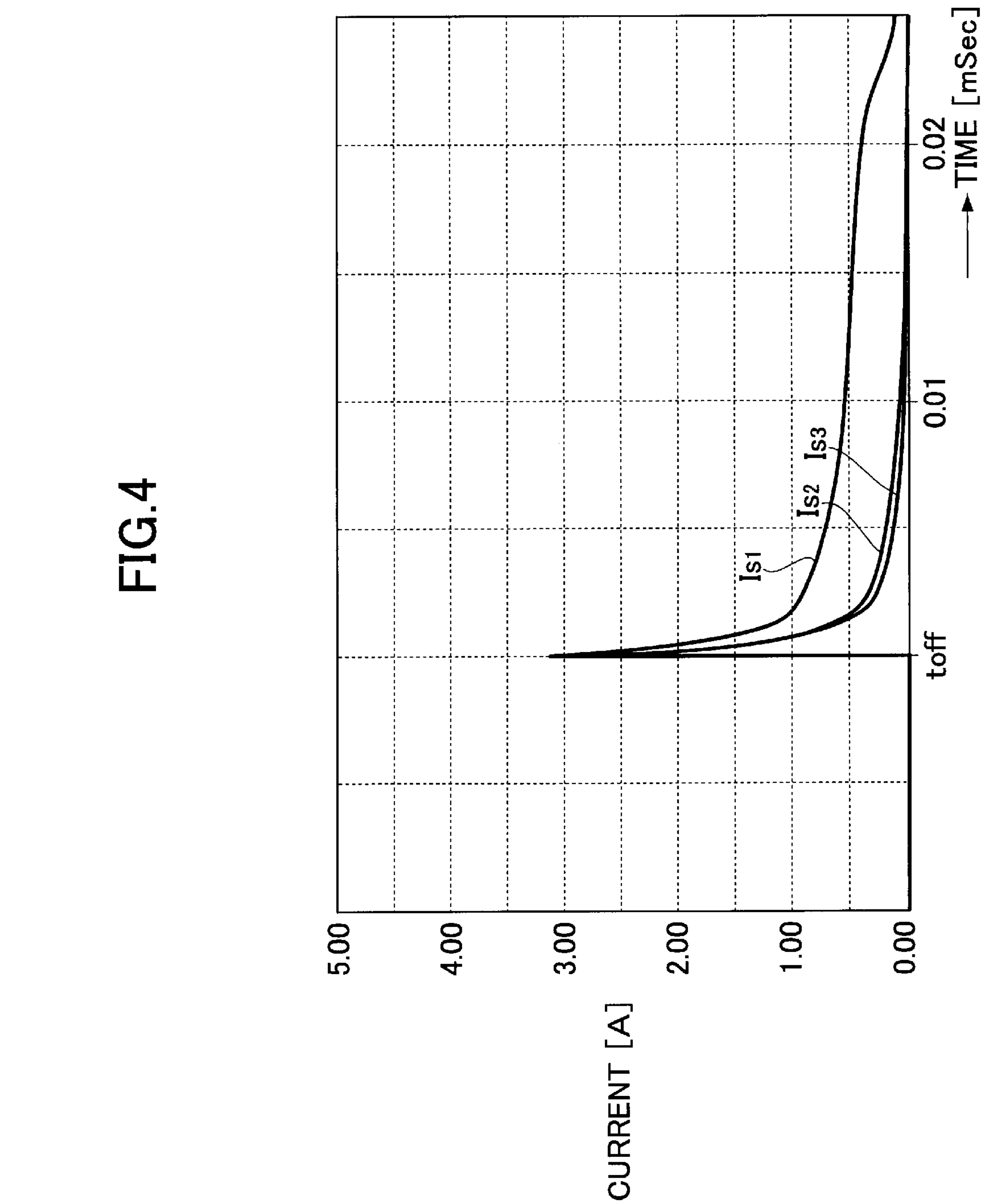
FIG. 4 is a characteristic graph explaining further the operation of the power cutoff device according to one embodiment of the present invention.

Next, the following description will describe an operation of the current cutoff circuit DT of the present embodiment with reference to FIGS. 3 and 4.

FIG. 3 is a characteristic graph obtained from experiments, and shows a change in the power voltages Vcc1, Vcc2, and Vcc3 during the transient period when the open/close switch elements B1, B2, and B3 are opened simultaneously at the cutoff point toff while the constant voltages V1 (=5.0 volts), V2 (=3.3 volts), and V3 (=2.7 volts) generated respectively at the voltage regulators A1, A2, and A3 are applied to the load circuits CQT1, CQT2, and CQT3 as the power voltages Vcc1, and Vcc2, and Vcc3, respectively. FIG. 4 is a characteristic graph showing a change in the sink currents Is1, Is2, and Is3 measured under the same conditions as those of FIG. 3.

Design values of the transistors Q1 through Q6, resistors R1 through R9, capacitance elements C1 through C3 and the like set in obtaining the experimental results are the design factors which can be determined as needed, and such values are not specified herein for ease of explanation. Also, the description of the load circuits CQT1, CQT2, and CQT3 as to their sizes and the like is omitted.

When the above-described control signal Son/off is set to the logical level "H" after desired values are set in the resistors R7, R8, and R9 respectively in the variable current sink units E1, E2, and E3, as shown in FIG. 3, the predetermined constant voltages V1, V2, and V3 generated respectively at the voltage regulators A1, A2, and A3 are supplied to the load circuits CQT1, CQT2, and CQT3 as the power voltages Vcc1, Vcc2, and Vcc3, respectively. At this point, as shown in FIG. 4, the sink currents Is1, Is2, and ls3 are nearly 0 ampere, and therefore, the circuit cutoff device 4 is virtually absent.

By shifting the control signal Son/off to the logical level "L" from "H" abruptly at the cutoff point toff, the open/close switch elements B1, B2, and B3 are opened simultaneously, whereupon the power voltages Vcc1, Vcc2, and Vcc3 enter the transient state immediately after the cutoff point toff.

Initially, as shown in FIG. 4, the sink currents Is1, Is2, and Is3 surge abruptly almost in synchronization with the cutoff point toff, then start to attenuate over time during the transient period, and eventually drop to nearly 0 ampere.

At this point, there is a correlation that the sink currents Is1, Is2, and Is3 shown in FIG. 4 change in response to a change in the power voltages Vcc1, Vcc2, and Vcc3 shown in FIG. 3 as the residual voltages, whereas the power voltages Vcc1, Vcc2, and Vcc3 shown in FIG. 3 as the residual voltages change in response to a change in the sink currents Is1, Is2, and Is3 shown in FIG. 4, and according to this correlation, both the sink currents Is1, Is2, and Is3 and the power voltages Vcc1, Vcc2, and Vcc3 start to attenuate.

Hence, the power voltages Vcc1, Vcc2, and Vcc3 do not attenuate naturally merely in accordance with the time constants under the influence of the peripheral capacitances, resistors, etc., but under the forced and regulated conditions according to the sink currents Is1, Is2, and Is3 determined by the correlation discussed above.

Hence, by adjusting the resistors R7, R8, and R9, it is possible to allow the power voltages Vcc1, Vcc2, and Vcc3 respectively applied to the load circuits CQT1, CQT2, and CQT3 to attenuate in accordance with the predetermined order and with the predetermined voltage values in a programmable manner.

Incidentally, the characteristics view of FIG. 3 shows a case designed so that the power voltages Vcc1 and Vcc3 attenuate abruptly, and the power voltage Vcc3 attenuates to 0 volt much sooner than the power voltage Vcc1, while the power voltage Vcc2 attenuates gradually. It should be appreciated, however, that it is possible to change the attenuation characteristics of the power voltages Vcc1, Vcc2, and Vcc3 in a programmable manner by adjusting the resistors R7, R8 and R9.

Further, it should be noted that the error detection unit DT detects a change in the voltage V1 on the power line FL1 during the transient period, and outputs the error detection signal Sc as the detection result, whereupon the variable current sink units E1, E2, and E3 set their respective sink currents Is1, Is2, and Is3 with reference to a change in the level of the error detection signal Sc (in other words, a change in the power voltage Vcc1 as the residual voltage). This means that the sink currents Is2 and Is3 are set relatively with reference to the sink current Is1. Hence, the power voltage Vcc2 and Vcc3 shown in FIG. 3 change with reference to a change in the power voltage Vcc1.

As has been discussed, the sink currents Is2 and Is3 or the power voltages Vcc2 and Vcc3 during the transient period are set with reference to the sink current Is1 or the power voltage Vcc1. Hence, when the values of the resistors R7, R8, and R9 are adjusted in advance, the resistor R7 is adjusted first to measure the sink current Is1 or the power voltage Vcc1, after which the resistors R8 and R9 are adjusted to adequate values with reference to the measurement result, so that the sink currents Is2 and Is3 or the power voltages Vcc2 and Vcc3 have the desired transient characteristics.

As has been discussed, it is possible to use the sink current Is1 or the power voltage Vcc1 as the reference in adjusting the rest of the sink currents Is2 and Is3 or the power voltages Vcc2 and Vcc3 by adjusting the resistors R8 and R9. Hence, compared with a case where no reference is set, the adjustment operation becomes easier, which in turn makes it possible to improve the adjustment accuracy.

As has been discussed, according to the power cutoff device 4 of the present embodiment, the transient characteristics caused when the power voltages Vcc1, Vcc2, and Vcc3 respectively being supplied to the load circuits CQT1, CQT2, and CQT3 are cut off, the power voltages Vcc1, Vcc2, and Vcc3 can be changed forcedly according to the sink currents Is1, Is2, and Is3, respectively, even under the influences of the time constants generated depending on the circumstances, such as the load circuits CQT1, CQT2, and CQT3. Hence, the power voltages Vcc1, Vcc2, and Vcc3 can be cut off in an adequate sequence at the load circuits CQT1, CQT2, and CQT3, respectively, which in turn allows suitable use of various kinds of electronic circuit devices operating on more than one power voltage.

Further, the power cutoff device 4 operates on electricity supplied from the power lines FL1, FL2, and FL3 which supply the power voltages Vcc1, Vcc2, and Vcc3 to the load circuits CQT1, CQT2, and CQT3, respectively. This makes it possible to omit a special power circuit for operating the power cutoff device 4. Consequently, there can be offered an advantage that a simple, compact, less-power-consuming circuit arrangement can be achieved.

According to the power cutoff device 4 shown in FIGS. 1 and 2, the error detection unit DT is provided somewhere between the power line FL1 and the ground line GL1 to detect a change in the power voltage Vcc1 on the power line FL1. It should be appreciated, however, that the error detection unit DT may be provided somewhere between the power line FL2 and the ground line GL2 to detect a change in the power voltage Vcc2 on the power line FL2, so that the bases of the NPN transistors Q4, Q5, and Q6 respectively in the variable current sink units E1, E2, and E3 are driven based on an error signal Sc obtained by the detection.

Alternatively, the error detection unit DT may be provided somewhere between the power line FL3 and the ground line GL3 to detect a change in the power voltage Vcc3 on the power line FL3, so that the bases of the NPN transistors Q4, Q5, and Q6 respectively in the variable current sink units E1, E2, and E3 are driven based on an error signal Sc obtained by the detection.

Figure 5:
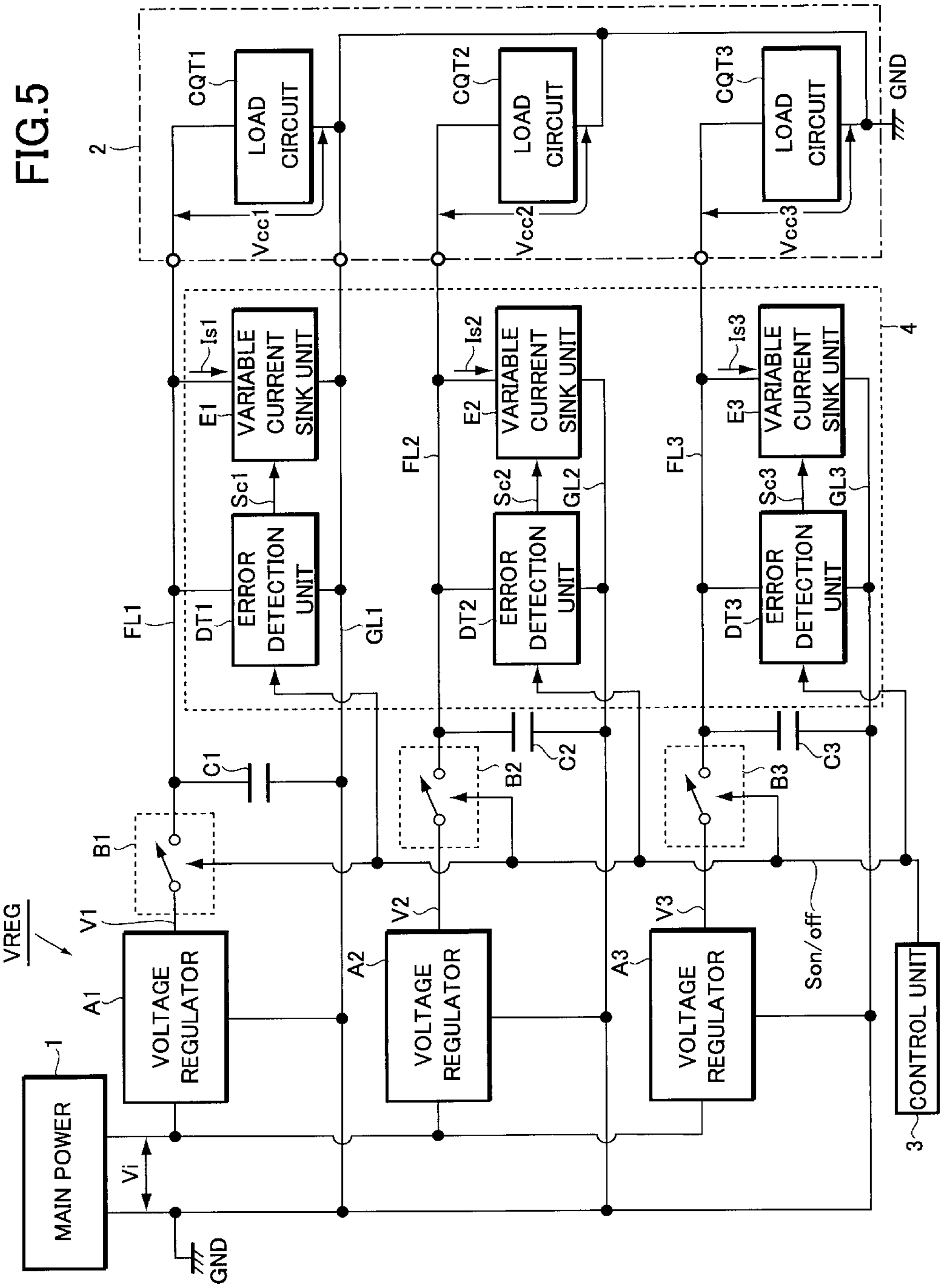
FIG. 5 is a block diagram depicting an arrangement of a modified example of the power cutoff device according to one embodiment of the present invention.
Figure 6:
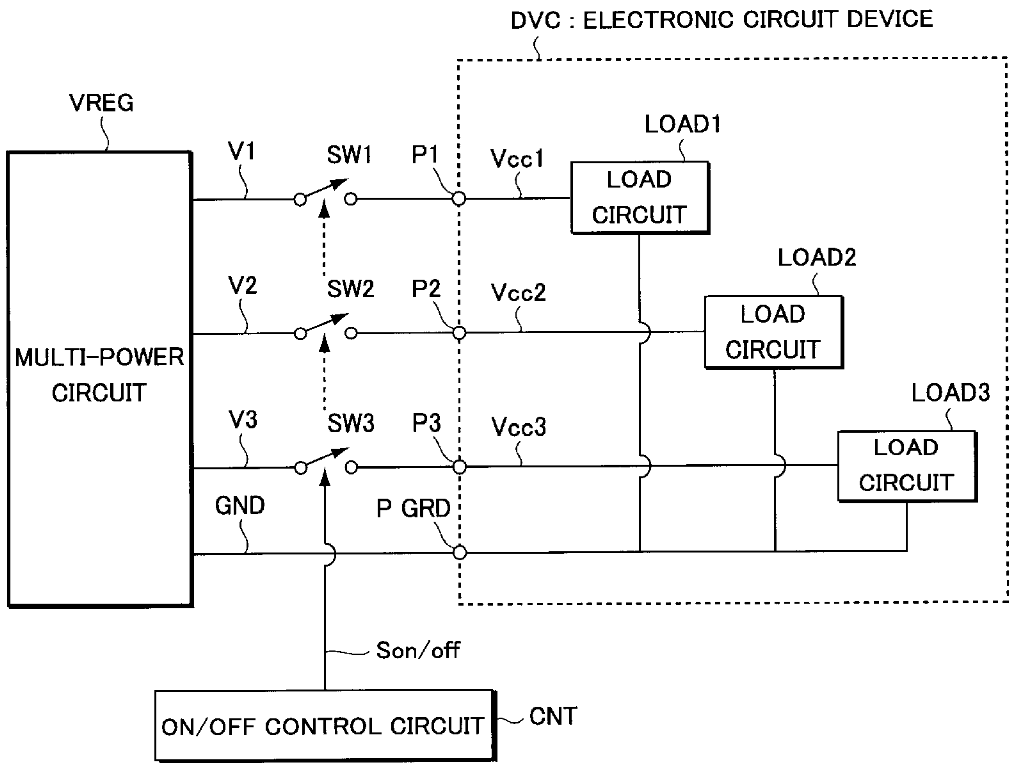
FIG.6 PRIOR ART
FIG. 6 is a block diagram depicting a conventional arrangement for supplying power voltages to an electronic circuit device which needs more than one power voltage.
Figure 7:
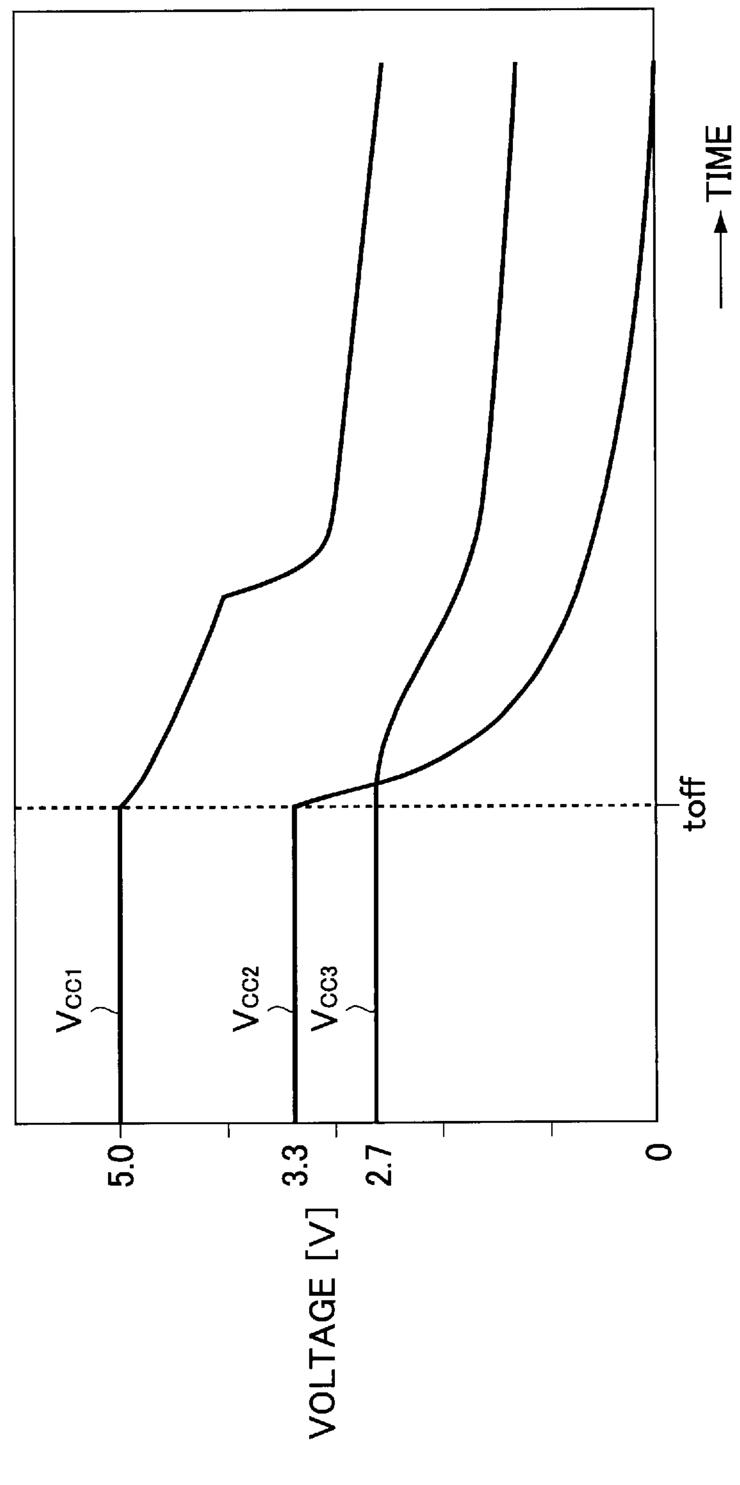
FIG. 7 is a graph showing an example of a change in the power voltages caused during a transient period after a power cutoff.

Further, as a modified example of the power cutoff device 4 of the present embodiment, the circuit may be arranged as shown in FIG. 5. In FIG. 5, like components are labeled with like reference numerals with respect to FIG. 1.

To be more specific, the power cutoff device 4 of FIG. 5 is provided with three error detection units DT1, DT2, and DT3, which are identical with the error detection unit DT shown in FIGS. 1 and 2, and provided between the power lines FL1, FL2, and FL3 and the ground lines GL1, GL2, and GL3, respectively. The error detection unit DT1 detects a change in the power voltage Vcc1 on the power line FL1, the error detection unit DT2 detects a change in the power voltage Vcc2 on the power line FL2, and the error detection unit DT3 detects a change in the power voltage Vcc3 on the power line FL3.

The base of the NPN transistor Q4 in the variable current sink unit E1 is driven by an error detection signal Sc1 outputted from the error detection unit DT1, the base of the NPN transistor Q5 in the variable current sink unit E2 is driven by an error detection signal Sc2 outputted from the error detection unit DT2, and the base of the NPN transistor Q6 in the variable current sink unit E3 is driven by an error detection signal Sc3 outputted from the error detection unit DT3.

According to the above arrangement, by adjusting the resistors R7, R8, and R9, it is possible to set the sink currents Is1, Is2, and Is3 respectively set in the variable current sink units E1, E2, and E3 independently in an almost complete manner. Hence, it is possible to adjust the transient characteristics of the power voltages Vcc1, Vcc2, and Vcc3 independently and accurately for each of the load circuits CQT1, CQT2, and CQT3.

Also, the resistors R7, R8, and R9 shown in FIG. 2 are fixed resistors. However, they may be replaced with variable resistors to facilitate the adjustment.

The error detection unit DT and the variable current sink units E1, E2, and E3 shown in FIG. 2 are composed of a fewer transistors and resistors in reducing the circuit size and the number of the elements, etc. However, they may be composed of other electronic components, such as operational amplifiers, as long as they function in the same manner.

The above embodiment described the power cutoff device 4 for adjusting the transient characteristics of the three power voltages Vcc1, Vcc2, and Vcc3. It should be appreciated, however, that the present invention is not limited to the foregoing, and the present invention can adjust the transient characteristics of any number of power voltages by including as many error detection units and variable current sink units as necessary.

As has been described above, according to the power cutoff device of the present invention, the power voltage detecting means detects a power voltage in the transient state caused at a cutoff of the power voltage being supplied to the load circuit. Then, the current sink means sets a sink current corresponding to the level of a detection signal representing the detection result, and sinks a current from the power line to the ground line according to the sink current. Consequently, it is possible to suitably adjust an attenuation factor of the power voltage in the transient state, a time necessary to reach the level of the ground line, etc.

Also, in case that each power voltage is cut off for an electronic circuit device provided with a plurality of load circuits each operating independently on their respective power voltages, the power voltage detecting means detects at least one of power voltages in the transient state and outputs a detection signal. Then, the current sink means sets a sink current corresponding to the level of the detection signal, and sinks a current from each power line to the ground line independently. Hence, it is possible to suitably adjust the attenuation factor of each power voltage being applied to their respective load circuits, a time necessary to reach the level of the ground line for each, etc. Consequently, in case that the transient characteristics of the power voltages with respect to each other are determined in advance by the ratings or the like to prevent the occurrence of a malfunction of the load circuits or the like, it is possible to adequately set transient characteristics by sinking a current from each power line to the ground line independently, which in turn makes it possible to adapt the power cutoff device to various kinds of electronic circuit devices which need more than one power voltage.

In addition, the power voltage detecting means and the current sink means are arranged to operate upon supply of electricity from the power voltage generated on the power line. Consequently, a special power or the like for operating the power cutoff device can be omitted, thereby making it possible to reduce the power consumption, and downsize and simplify the circuit.

Furthermore, the current sink means is arranged to set a sink current equivalent to a value of the detection signal outputted from the power voltage detecting means and amplified by an adjustable amplification factor. Consequently, by adjusting the amplification factor, it is possible to adequately adjust a value of the sink current, thereby making it possible to accurately adjust a change in the power voltage in the transient state.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A power cutoff device for cutting off a power voltage being supplied to a load circuit, comprising:

power voltage detecting means and current sink means provided between a power line and a ground line, said power line supplying a voltage generated by power means to said load circuit as the power voltage, wherein said power voltage detecting means detects a change in the power voltage generated on said power line and outputs a detection signal, and said current sink means sets a sink current corresponding to a level of said detection signal and sinks a current from said power line toward said ground line.

2. A power cutoff device for cutting off a plurality of power voltages being supplied to a plurality of load circuits, comprising:

power voltage detecting means and current sink means provided between a plurality of power lines and ground lines, said plurality of power lines supplying a plurality of voltages generated by power means to said plurality of load circuits as said plurality of power voltages, wherein said power voltage detecting means detects a change in a power voltage generated on any of said plurality of power lines and outputs a detection signal, and said current sink means sets a sink current corresponding to a level of said detection signal and sinks a current from each of said plurality of power lines toward a ground line independently.

3. A power cutoff device for cutting off a plurality of power voltages being supplied to a plurality of load circuits, comprising:

power voltage detecting means and current sink means provided between a plurality of power lines and a ground line, said plurality of power lines supplying a plurality of voltages generated by power means to said plurality of load circuits as said plurality of power voltages, wherein said power voltage detecting means detects a change in a power voltage generated on each of said plurality of power lines and outputs a detection signal corresponding to each power voltage, and said current sink means sets a sink current corresponding to a level of said detection signal corresponding to each power voltage and sinks a current from each of said plurality of power lines toward said ground line independently.

4. The power cutoff device according to any one of claims 1 through 3, wherein said power voltage detecting means and said current sink means operate upon receiving a supply of electricity from the power voltage generated on said power line.

5. The power cutoff device according to any one of claims 1 to 3, wherein said current sink means sets a sink current equivalent to a value of the detection signal outputted from said power voltage detecting means and amplified by an adjustable amplification factor.

* * * * *